Aug. 24, 1965

C. H. COLEMAN, JR  3,202,769
APPARATUS FOR MODIFYING THE TIMING
CHARACTERISTIC OF A SIGNAL

Filed Aug. 2, 1960

INVENTOR.
CHARLES H. COLEMAN, JR.

BY his ATTORNEYS

INVENTOR.
CHARLES H. COLEMAN, JR.

Aug. 24, 1965 C. H. COLEMAN, JR 3,202,769
APPARATUS FOR MODIFYING THE TIMING
CHARACTERISTIC OF A SIGNAL
Filed Aug. 2, 1960 7 Sheets-Sheet 4

FIG. 3B

INVENTOR.
CHARLES H. COLEMAN, JR.
BY
his ATTORNEYS

Aug. 24, 1965

C. H. COLEMAN, JR
APPARATUS FOR MODIFYING THE TIMING
CHARACTERISTIC OF A SIGNAL 3,202,769

Filed Aug. 2, 1960

INVENTOR.
CHARLES H. COLEMAN, JR.

BY
Brumbaugh, Free, Graves & Donohue
his ATTORNEYS

Aug. 24, 1965   C. H. COLEMAN, JR   3,202,769
APPARATUS FOR MODIFYING THE TIMING
CHARACTERISTIC OF A SIGNAL
Filed Aug. 2, 1960   7 Sheets-Sheet 6

INVENTOR.
CHARLES H. COLEMAN, JR.
BY
his ATTORNEYS

Aug. 24, 1965

C. H. COLEMAN, JR 3,202,769
APPARATUS FOR MODIFYING THE TIMING
CHARACTERISTIC OF A SIGNAL

Filed Aug. 2, 1960

INVENTOR.
CHARLES H. COLEMAN, JR

BY

Brumbaugh, Free, Graves & Donohue
his ATTORNEYS.

United States Patent Office
3,202,769
Patented Aug. 24, 1965

3,202,769
APPARATUS FOR MODIFYING THE TIMING
CHARACTERISTIC OF A SIGNAL
Charles H. Coleman, Jr., Belmont, Calif., assignor to
Columbia Broadcasting System, Inc., New York, N.Y.,
a corporation of New York
Filed Aug. 2, 1960, Ser. No. 46,988
30 Claims. (Cl. 179—100.1)

The present invention relates to novel and highly effective means for modifying the timing characteristics of signals having values varying as a function of time, so as to introduce a desired effect or eliminate an undesired effect, although it is not limited to such uses.

Signals having values varying as a function of time are widely used in the field of electronics. In television, for example, signals of this character are used for synchronization purposes and to represent picture information. Signals representing sound also fall in this broad category. All such signals have timing characteristics which must be accurately maintained if they are to be effective for the intended purpose. If this is not done in television, for example, the quality of the picture reproduced by a picture tube or other terminal device is adversely affected, i.e., there is geometric distortion. Similarly, if the timing characteristic of a signal representing sound is changed as by speed variations in sound recording or reproducing mechanism, the sound will not be faithfully reproduced but distortion of the kind known as "wow" may be present.

In practice, it is often not possible with the equipment available commercially, to maintain the signal timing characteristic to the required degree of accuracy. Accordingly, there has been a pressing need for means capable of modifying the timing characteristic of a signal in such fashion as substantially to eliminate the above-noted undesired effects. Also, there are instances when it may be desirable to modify the timing characteristic of a signal to introduce a particular effect, e.g., to deliberately distort a television signal to produce special "effects," without tampering with camera controls, or to produce a change of time scale for any wideband information signal.

It is an object of the invention, accordingly, to provide new and improved means for modifying the timing characteristics of signals having values varying as a function of time.

Another object of the invention is to provide new and improved means for automatically maintaining a desired timing characteristic for a signal, e.g., correcting unstable synchronizing signals.

A further object of the invention is to provide new and improved means for imparting to a signal having a given timing characteristic, a different timing characteristic.

Still another object of the invention is to provide new and improved apparatus for automatically correcting for timing errors in repetitive signal components.

A further object of the invention is to provide new and improved apparatus for automatically correcting for timing errors in periodically occurring information carrying signals.

Another object of the invention is to provide new and improved signal delay line means having time delay characteristics that are a function of a control signal applied thereto.

Still another object of the invention is to provide new and improved signal delay line means in which the time delay is substantially unaffected by information carrying signals supplied thereto.

A further object of the invention is to provide new and improved electrical filter means having a bandwidth responsive to a control signal.

Broadly speaking, modification of the timing characteristic of a signal is effected in accordance with the invention by passing the signal through novel time delay means having a time delay that is a function of a control signal applied thereto. This time delay means comprises lumped constant transmission line means in which unilaterally conductive devices are used as shunt elements instead of fixed capacitors. The characteristics of the unilaterally conductive devices are such that they undergo a change in effective capacitance in response to the back bias voltage applied to them. By appropriate adjustment of the control voltage applied to the line means, the timing characteristic of the signal transmitted therethrough can be modified as desired.

Where it is desired to modify the timing characteristic of a signal so as to compensate or correct for errors therein, the control voltage applied to the delay line means may be made to vary automatically in response to such errors, suitable error detection means being provided for this purpose.

Since the frequency bandwidth of the delay line means also varies with the control voltage, the delay line means of the invention also constitutes an effective adjustable band pass filter.

For a better understanding of the invention, reference is made to the following detailed description of several representative embodiments, taken in conjunction with the accompanying drawings in which.

Figure 2:
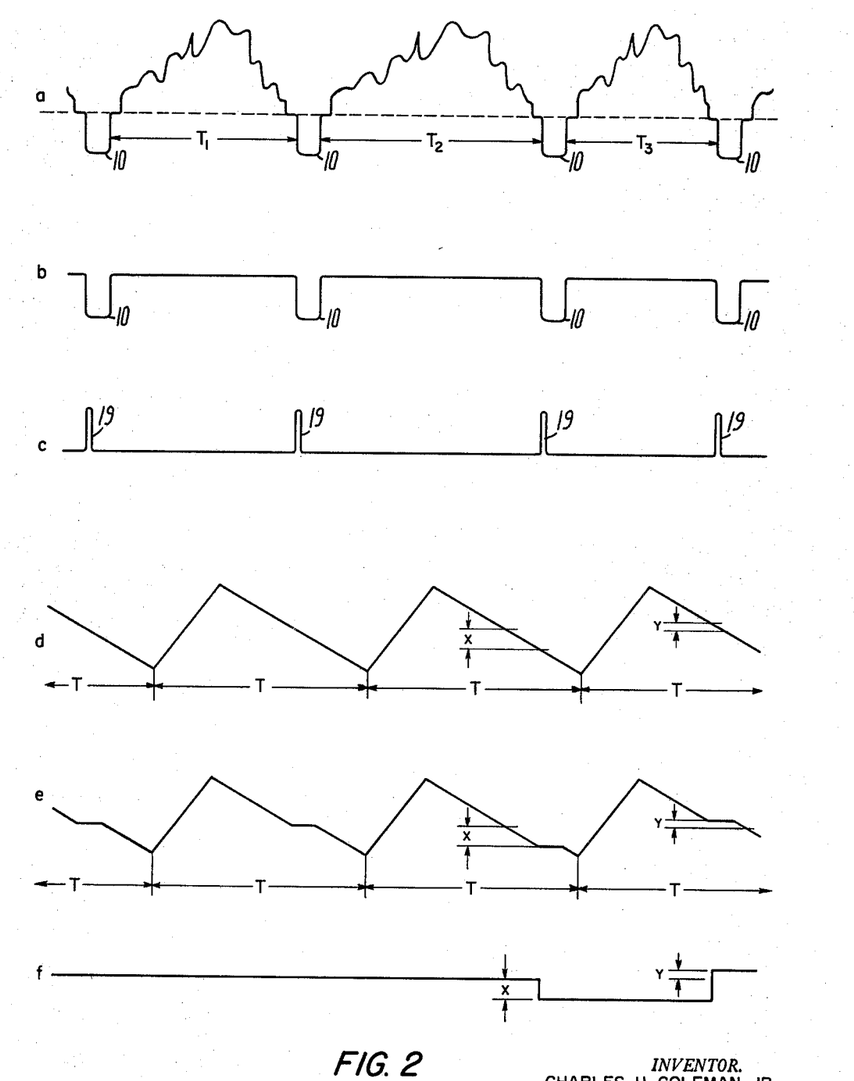
FIG. 2 is a graph illustrating representative waveforms in different components of the systems shown in FIGS. 1, 3A and 3B.

It will be readily apparent that the invention may be embodied in a wide variety of systems for modifying the timing characteristic of a signal. For purposes of illustration, however, it will be described first as incorporated in a system for effecting horizontal line timing corrections in a signal carrying video information. In this application, the signal is the familiar composite video signal used in television transmission. By way of example, it may have the waveform indicated generally in FIG. 2a, the part of the curve above the dotted line representing the video information in each line and the part of the waveform below the dotted line comprising the usual horizontal synchronizing pulses 10.

As indicated above, the timing of the horizontal components of the signal may not be strictly accurate because of limitations or defects in the shipment used in producing the signal. Thus, in FIG. 2a, the third synchronizing pulse 10 may occur late so that the time $T_2$ between it and the preceding synchronizing pulse is longer than the time $T_1$ between the first two pulses. Similarly, the fourth pulse may occur early so that the time $T_3$ between it and the preceding pulse is less than the time $T_1$ between the first and second synchronizing pulses. As a result of such timing errors, the corresponding scanning lines reproduced on the face of a cathode ray tube, for example, will not begin at the same vertical reference datum so that vertical lines in the reproduced picture will appear to be curved or otherwise distorted.

Timing errors of this character are corrected according to the invention by delaying each portion of the composite video signal representing a picture scanning line by an amount which is a function of the timing error. This amount is determined by sensing the instantaneous time differences between the horizontal synchronizing pulses and similar reference pulses occurring at the average synchronizing pulse rate. The delay is varied by an amount equal and opposite to the differences detected so that the horizontal timing of the output signal becomes the same as the average. The sensing operation is preferably performed during the retrace time before the beginning of each line in the picture and the value of the signal delay is held constant for the duration of the scanning line.

Figure 1:
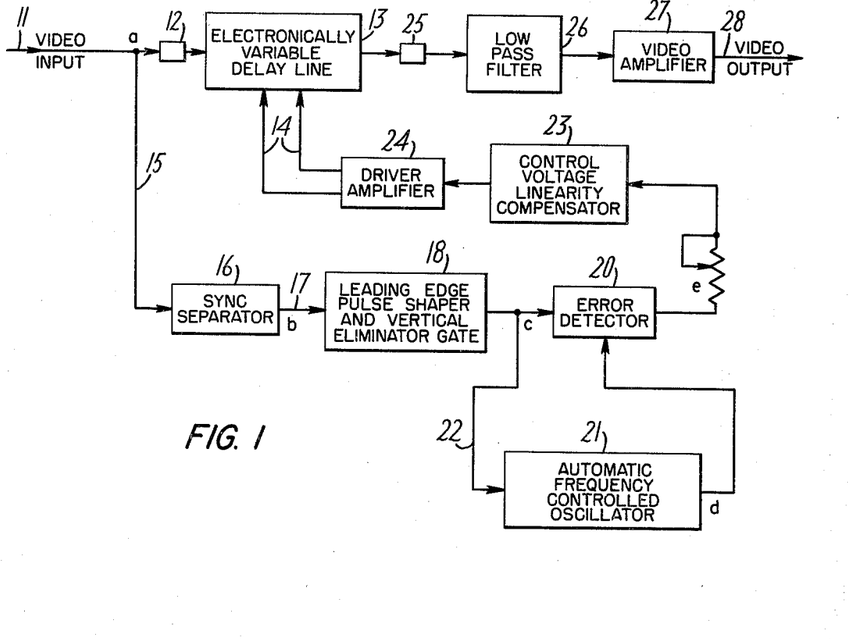
FIG. 1 is a block diagram of a simplified form of system for modifying the timing characteristic of a signal according to the invention.

Thus, in FIG. 1, a composite video signal similar to that shown in FIG. 2a is supplied from the line 11 through an attenuator 12 to a variable delay line 13, the delay characteristic of which is a function of a control voltage supplied thereto over the conductors 14.

The control voltage for the delay line 13 is derived by supplying the composite video signal through a conductor 15 to a conventional synchronizing pulse separator device 16 which removes the video information leaving only the periodically time synchronizing pulse 10 as shown in FIG. 2b. The separated synchronizing pulses are then supplied over a conductor 17 to conventional circuitry indicated by the box 18 which generates a very sharp pulse at the leading edge of each of the pulses 10 and eliminates the vertical synchronizing pulses from the signal. The output, which is a succession of very sharp pulses 19 (FIG. 2c) in time coincidence with the leading edges of the corresponding horizontal synchronizing pulses 10, respectively, is supplied to an error detector device 20.

The error detector device 20 receives as a second input a signal at the average horizontal line frequency rate from an automatic frequency controlled oscillator 21 of conventional type which also receives the pulses 19 over the conductor 22. Preferably, the signal from the oscillator has a sawtooth or similar waveform. The output of the error detector 20 is a function of the instantaneous difference in phase between the pulses 19 and the signal from the frequency controlled oscillator 21. In other words, it is proportional to the difference in timing between the instantaneous horizontal synchronizing pulses and reference signals occurring at the average horizontal synchronizing pulse rate.

This error signal is supplied from the error detector 20 to a linearity compensator device 23 which supplies an input to a driver amplifier 24, the output of which is fed to the variable delay line 13 over the conductors 14. The purpose of the linearity compensator merely is to compensate for any nonlinearity in the relation between the time delay and the voltage applied to the delay line 13 so that the video signal transmitted over the delay line 13 will be delayed an amount linearly proportional to the time differences between the instantaneous horizontal synchronizing pulses and reference pulses occurring at the average horizontal sychronizing pulse rate.

The delayed composite video signal is then fed from the delay line 13 through an attenuator 25 and a low pass filter 26 to a video amplifier 27 which supplies the corrected video signal to the output conductor 28. The purpose of the filter 26 merely is to restrict the bandwidth of the transmission channel to a constant amount (say, 4.2 megacycles per second) adequate to pass the desired high frequency components, but less than the lowest bandwidth excursion of the delay line 13 resulting from a change in its time delay characteristic.

Figure 3A:
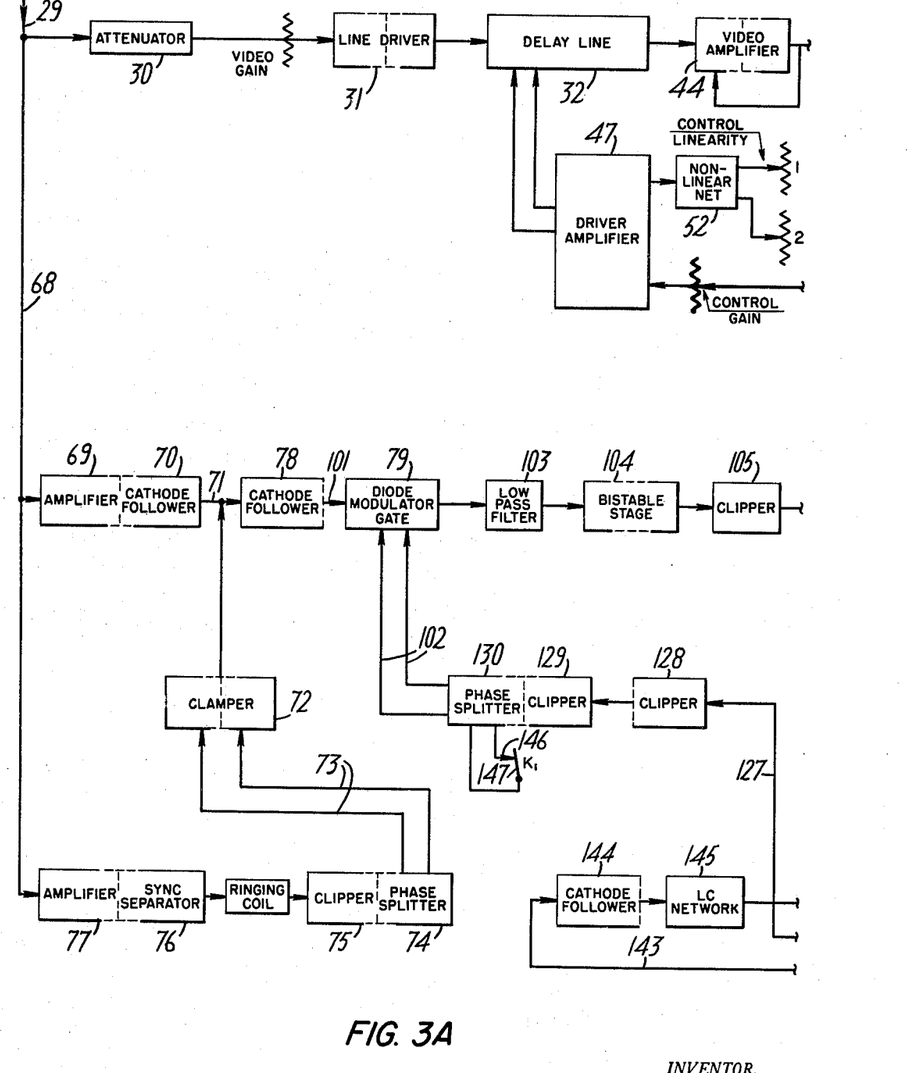
FIGS. 3A and 3B illustrate schematically a practical form of signal timing correction system according to the invention which is suitable for correcting for timing errors in video or similar signals.
Figure 3B:
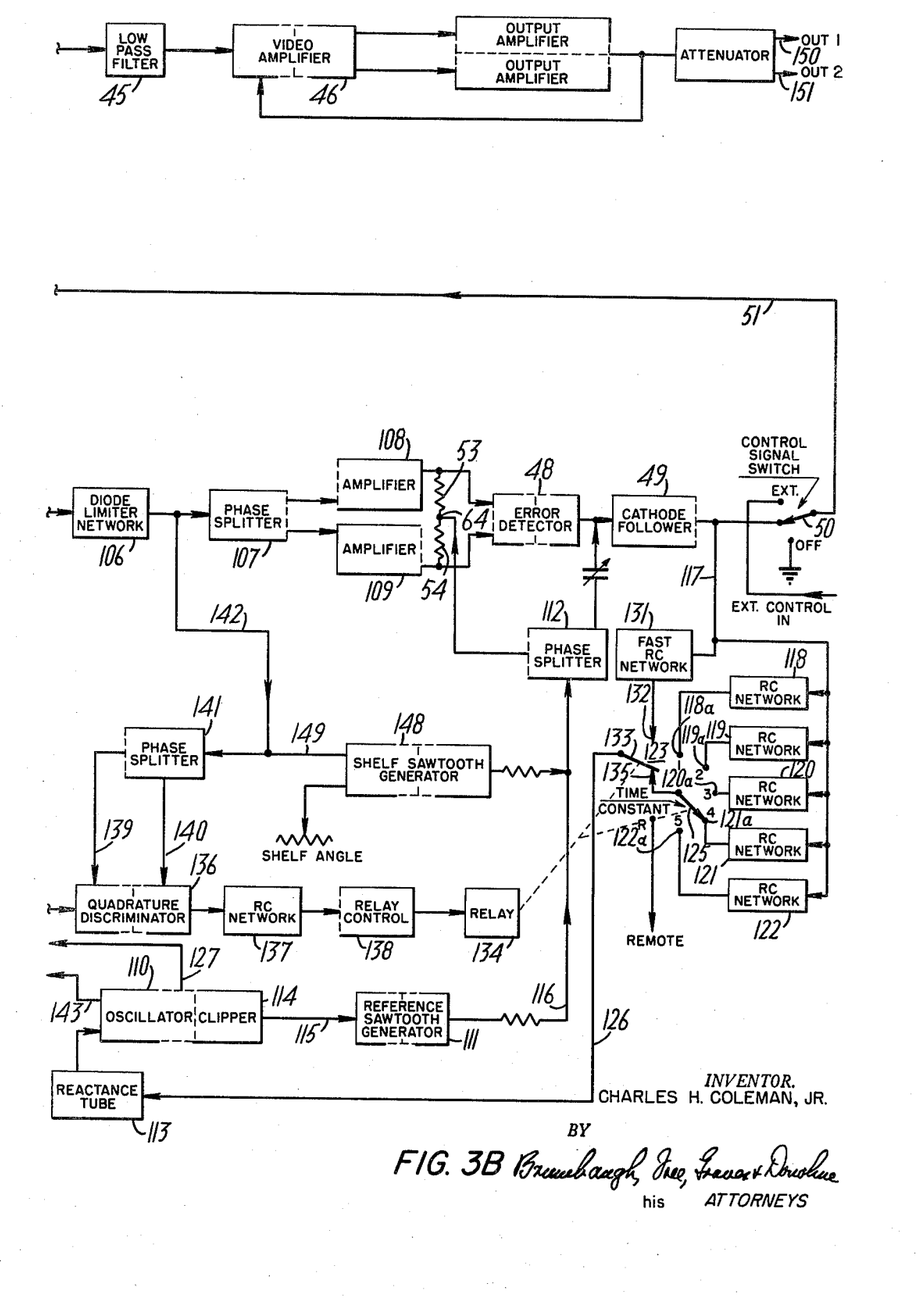

FIGS. 3A and 3B, when placed side by side, show the basic components of a practical signal timing correction system for use with video information carrying signals derived from camera or video tape reproducing equipment, for example. In this embodiment, the composite video signal input is supplied from the conductor 29 through an attenuator 30 to an amplifier 31 which provides an output to a delay line 32.

Figure 5:
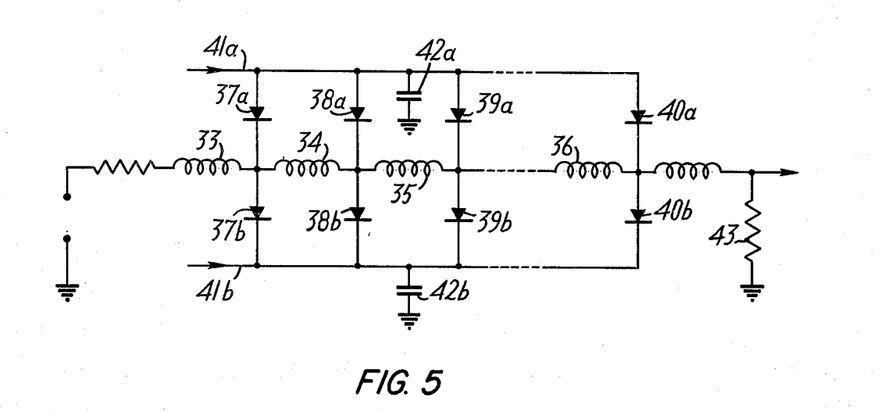
FIG. 5 is a schematic diagram of a typical controllable delay line constructed according to the invention.

The delay line may be of the lumped constant type comprising, for example, a plurality of series inductors 33, 34, 35, 36, and shunt connected voltage variable capacitors 37a, 37b, 38a, 38b, 39a, 39b, 40a, 40b (FIG. 5). The voltage variable capacitors may be semiconductor (silicon p-n) junction diodes of the type described at pages 29–34 of the November 1959 issue of the publication "Semiconductor Products," and they are connected from the junctions between adjacent inductors to the conductors 41a and 41b. The conductors 41a and 41b are bypassed to ground for high frequencies by the capacitors 42a and 42b and the line is terminated in an impedance 43.

To minimize reflections on the line as seen at the output, the line is matched in impedance at both input and output. The end terminations may be made equal to the center value of characteristic impedance, or they may be staggered, one being a little above and the other a little below the center value to achieve a wider range.

The delay line may be designed for an average delay of, say, 3 microseconds, and a range of variation of, say, 1.2 microseconds.

The output of the delay line 32 (FIG. 3A) is supplied to a conventional video amplifier 44 and through a low pass filter 45 to an amplifier 46, the output from which is the time corrected composite video signal. The filter 45 is necessary only where the variation in bandwidth and rise time of the delay line incident to the variations in time delay are objectionable. It should preferably have a cut-off frequency lower than the minimum value reached by the delay line.

The variable delay produced by the delay line 32 is controlled by a push-pull voltage supplied to the conductors 41a and 41b (FIG. 5) from a suitable low impedance source 47 (FIG. 3A) which may be any conventional push-pull amplifier. The control voltages are applied push-pull with respect to ground, i.e., the voltages impressed upon the two conductors 41a and 41b are at all times equal and of opposite polarity as referred to ground or to the junctions between the diodes. As a result, the output video signal does not contain any components of the control voltage. In addition, variations of diode capacitance caused by the video signal are cancelled to a first order, since an increase of reverse voltage due to the video signal on one diode is matched by a decrease on the other. Thus, for any given control voltage value, there is a constant value of delay, no matter what the video signal level may be.

The amplifier 47 receives an input from an error detector 48 through a cathode follower 49, a control signal switch 50, the conductor 51 and a nonlinear circuit 52 which, as indicated above, is designed to compensate for the nonlinear relation between the voltage applied to the delay line and the time delay characteristic thereof.

Figure 6:
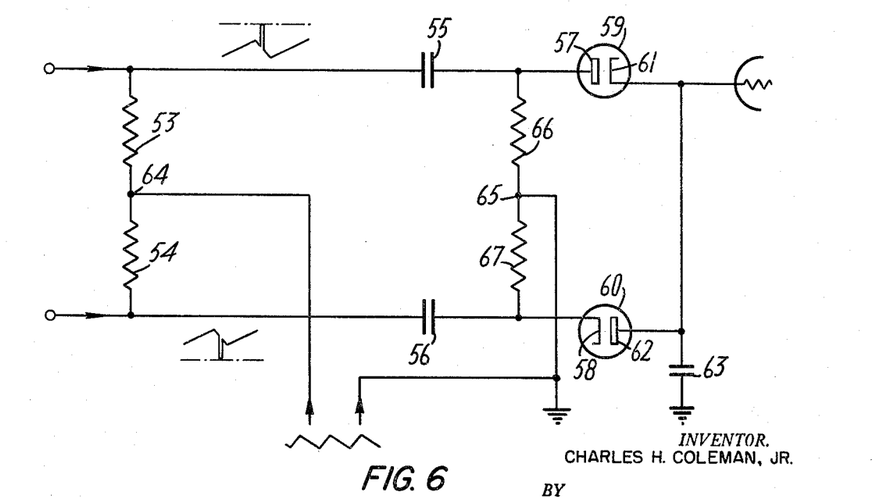
FIG. 6 illustrates schematically a circuit suitable for detecting the difference in timing between two signals in the portion of the system shown in FIG. 3B.

The error detector 48 may be any suitable phase discriminator which does not involve filtering of the output and in which means are provided to prevent the input signals from appearing in the output. A circuit of the type shown in FIG. 6 is suitable for the purpose. In FIG. 6, short, narrow pulses representative of the instantaneous synchronizing pulses are applied as one input across the series connected resistors 53 and 54, and through relatively large capacitors 55 and 56 to the anode 57 and cathode 58, respectively, of a pair of diodes 59 and 60, respectively. The cathode 61 of the diode 59 and the anode 62 of the diode 60 are connected together and through a relatively small capacitor 63 to ground, as shown.

Periodically varying signals (e.g., a reference sawtooth waveform) of the same average frequency as the synchronizing pulses are supplied between a tap 64 between the resistors 53 and 54 and a tap 65 on a resistance network including a pair of resistors 66 and 67 connected in series between the anode 57 of the diode 59 and the cathode 58 of the diode 60.

In operation, the capacitor 63 is charged to a voltage, the value of which is a function of the time at which the signal pulses occur in relation to the reference waveform. This charging occurs during the conduction of the diodes 59 and 60 which lasts for the duration of the signal pulses. Since the diodes are nonconducting during the rest of the time, and since no other discharge path is provided, the voltage on the capacitor remains constant until the next signal pulse.

The short, narrow pulses representative of the instantaneous synchronizing pulses are derived by supplying a portion of the composite video signal over the conductor 68 (FIG. 3A) to an amplifier 69, the output of which is fed through a cathode follower 70 to a conductor 71. The blanking level of the composite video signal is then established at a fixed value by a conventional driven clamping circuit 72 which receives synchronizing pulses over the conductors 73 from a phase splitter 74. The phase splitter 74 is preceded by a conventional clipper 75 which receives from a conventional synchronizing signal separator 76 a series of short keying pulses derived from the horizontal synchronizing pulses. The signal separator 76 is preceded by an amplifier 77 having input terminals connected to receive the composite video signal from the conductor 68.

The composite video signal with the blanking level established at a fixed value and with the synchronizing pulses going in the positive direction is applied to a cathode follower 78 which provides one output to a diode modulator gating device 79.

Figure 4:
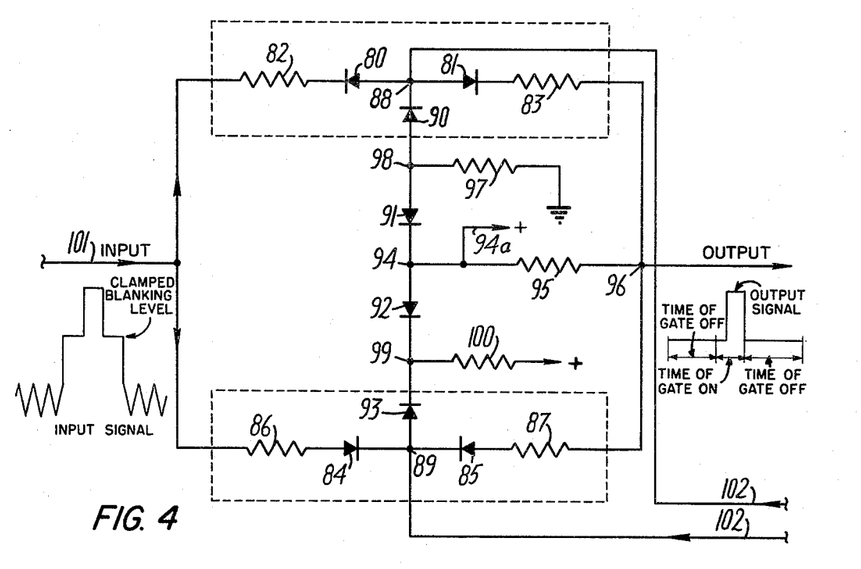
FIG. 4 is a schematic diagram of a diode gate circuit that is used in the portion of the system shown in FIG. 3A.

As best shown in FIG. 4, the gating device 79 is a form of bridge comprising two adjacent arms having the diodes 80 and 81, respectively, and the series resistors 82 and 83, respectively, therein, and two other adjacent arms having the diodes 84 and 85, respectively, and the series connected resistors 86 and 87, respectively, therein. The resistors 82, 83, 86 and 87 serve to minimize differences in the forward conducting impedance of the diodes 80, 81, 84 and 85, so that equal currents will flow in the upper and lower branches of the gate. Connected between the bridge junctions 88 and 89 is a shunt circuit including the diodes 90 and 93, which normally are suitably biased so as to be nonconducting. While any source of voltage may be used to provide bias, it is preferred to use suitably energized Zener diodes 91 and 92 of appropriate voltage ratings for this purpose. The diode 91 may be energized through a circuit including a conductor 94a connected to a suitable positive voltage and to the junction 94 between the diodes 91 and 92, and a resistor 97 connected to ground. Similarly, the diode 92 may be energized by connecting the junction 99 between it and the diode 93 through a resistor 100 to a positive voltage higher than the voltage to which the conductor 94a is connected.

The video signal with the blanking level accurately maintained at a desired value is supplied to the diode gate 79 from the cathode follower 78 over the conductor 101; the junctions 88 and 89 of the diode gate 79 are connected to receive gating signals over the conductors 102; and the output of the diode gate 79 appears at the junction 96 which is connected through a load resistor 95 to the junction 94.

Normally, a voltage is impressed across the junctions 88 and 89 of the gate 79 from the conductors 102 which is of such polarity and magnitude that the shunt diodes 90 and 93 conduct, while the series diodes 80, 81, 84 and 85 are biased to the nonconducting. Gating is effected by changing the voltage supplied over the conductor 102 to the proper polarity and magnitude to bias the shunt diodes 90 and 93 to the nonconducting state and to render the series diodes 80, 81, 84 and 85 conductive. In this fashion, the diode gate 79 is adapted to be rendered conducting periodically for approximately 5 microseconds beginning approximately one microsecond prior to the leading edge of each synchronizing pulse. As a result, only the synchronizing pulse in each scanning line of the composite video signal is transmitted from the conductor 101 to the conductor 102a, and the alternate double frequency pulses occurring during the vertical interval are eliminated.

The portion of the signal transmitted by the diode gate 79 is passed through a low pass filter 103 having an upper limit of, say 750 kc., which restricts the noise components, to a D.C. coupled bistable stage 104 which is adapted to provide narrow pulses of definite width coincident with the leading edge of each synchronizing pulse.

The output of the bistable stage 104, after clipping in conventional clipper devices 105 and 106 is supplied to a phase splitter device 107 which provides push-pull pulse inputs to the amplifiers 108 and 109. This output is now a succession of narrow pulses coincident with the leading edges of the horizontal synchronizing pulses. The push-pull outputs of the amplifiers 108 and 109 are supplied as inputs to the resistors 53 and 54 in the error detector 48 (FIG. 6).

The gating pulses supplied to the diode modulator 79 over the conductors 102 are derived from an oscillator 110 which is designed to operate at the horizontal line scan frequency which in the United States practice is nominally 15,750 cycles per second. The oscillator 110 is connected in a conventional automatic frequency stabilization circuit including a reference sawtooth generator 111, a phase splitter 112, the error detector 48 and a reactance tube 113. The signal from the oscillator 110, after clipping in a conventional clipper 114 is supplied to the reference sawtooth generator 111 over a conductor 115.

The output of the reference sawtooth generator 111, which is synchronized with the signal from the oscillator 110, is fed through a conductor 116 to the phase splitter 112 which supplies sawtooth waves at a frequency of 15,750 cycles per second in push-pull to tap 64 of the error detector (FIG. 6) and ground. The output of the error detector cathode follower 49 is supplied over a conductor 117 to the inputs of a plurality of RC integrating networks 118, 119, 120, 121 and 122 having different time constants, the outputs of which are connected to the fixed contacts 118a, 119a, 120a, 121a and 122a of a switch 123. The switch 123 has a movable contact 125 which is connected by a conductor 126 to the reactance tube 113. By manipulating the movable contact 124, the time constant of the automatic frequency stabilization system can be adjusted over a desired range.

As is well known in the art, the D.C. output fed from the error detector cathode follower 49 to the reactance tube 113 automatically controls the frequency of oscillation of the oscillator 110 and maintains it at the average synchronizing pulse rate.

The frequency stabilized signal, after clipping in conventional clipper devices 128 and 129 (FIG. 3A) is fed to a phase splitter 130. The phase splitter 130 supplies a succession of pulses at the average frequency of the synchronizing pulses in push-pull to the diode gate 79 over the conductors 102. These pulses render the gate 79 alternately conducting and nonconducting, as described above.

In order to provide for fast lock-in of the horizontal oscillator 110 with the horizontal synchronizing pulses, it is desirable on starting up and in the case of a signal interruption to reduce the time constant of the feedback path between the error detector cathode follower 49 and the reactance tube 113. To this end, an R.C. integrating network 131 (FIG. 3B) having a suitably low time constant is interposed between the conductor 117 and the switch contact 132, which normally is in engagement with the movable contact 133 when the system is not energized. When synchronism between the oscillator 110 and the synchronizing pulses is achieved, a relay 134 is adapted to be energized to disengage the contacts 132 and 133 and to bring the contacts 133 and 135 into engagement, the latter being connected to the switch 125.

The relay 134 is energized by a discriminator device 136 through an RC network 137 and a relay control device 138. The discriminator 136 receives narrow pulses coincident with the leading edges of the synchronizing pulses over the leads 139 and 140 from a phase splitter 141 which receives a corresponding pulse input from the diode limiter 106 over the conductor 142. The second input to the discriminator 136 is a signal of the same frequency as the output of the oscillator 110 but in phase quadrature thereto. This quadrature signal is taken from the oscillator 110 and is fed to the discriminator 136 through a conductor 143, a cathode follower 144 and an LC network 145.

As is well known in the art, the discriminator 136 develops a D.C. control voltage only when the synchronizing pulses are in synchronism with the oscillator 110. When this condition obtains, D.C. control voltage is supplied through the RC network 137 to the relay control device 138 which energizes the relay 134, causing its contacts 133 and 135 to become engaged. At the same time, its contacts 146 and 147 at the phase splitter 130 are engaged (FIG. 3A).

When the system is first energized and is out of synchronism, the relay 134 will not be energized so that the contacts 132 and 133 will be in engagement and the contacts 146 and 147 will be disengaged. The closing of the contacts 132 and 133 connects the reactance tube 113 to the output of the error detector cathode follower 49 through the fast RC integrating network 131. The opening of the contacts 146 and 147 disables the phase splitter 130 to the diode gate 79. Under these conditions, the automatic phase control loop has the necessary properties for good pull-in.

When the system pulls into synchronism, the relay 134 is energized, closing the contacts 146 and 147 and bringing the contact 133 into engagement with the contact 135. The closing of the contacts 133 and 135 connects the reactance tube 113 to the switch 125 so that the time constant in the feedback path has a suitable value as required for good dynamic stability of the system.

In order to avoid the formation in the error signal of sharp spikes resulting from the combination of the narrow rectangular pulses 19 (FIG. 2c) and the sawtooth waveform (FIG. 2d) from the sawtooth generator 111, it is desirable to add to the return trace portion of the sawtooth waveform (FIG. 2d) a waveform of suitable width and shape as to provide a flat base at the time the rectangular synchronizing pulses occur. An appropriate supplemental waveform may be provided by a sawtooth generator 148 which receives the narrow pulses representing the synchronizing pulses over the conductors 142 and 149 and provides an output to the conductor 116 for combination with the reference sawtooth wave from the generator 111. This waveform should be opposite in phase to the waveform from the generator 111 and it may be 1 microsecond wide, for example. The composite sawtooth wave is shown in FIG. 2e.

In operation, when power is first applied to the system shown in FIGS. 3A and 3B, the relay contacts 132 and 133 will be engaged, while the relay contacts 146 and 147 will be disengaged, so that the automatic phase control loop for the oscillator 110 has the necessary properties for good pull-in which will quickly occur. At synchronism, the relay 134 will be energized, connecting the relay contact 133 to the contact 135 and engaging the relay contacts 146 and 147. The switch 125 is now adjusted manually to include a selected one of the RC networks 118, 119, 120, 121 and 122 in the automatic phase control loop for the oscillator 110, as required for good dynamic stability of the system.

The system now will provide an output from the cathode follower 49 which is proportional to the differences in timing between the instantaneous synchronizing pulses and pulses occurring at the average synchronizing pulse rate (FIG. 2f). This control voltage is supplied through the conductor 51 and the nonlinear network 52 to the driver amplifier 47 which impresses a corresponding push-pull voltage on the terminals 41a and 41b of the delay line (FIG. 5). This will adjust the delay introduced by the latter so as to compensate for the differences in timing between the instantaneous synchronizing pulses and the pulses occurring at the average synchronizing pulse rate. As a result, the composite video signal appearing at the output terminals 150 and 151 (FIG. 3B) will be corrected for such differences.

In a practical system, the delay line 32 may be designed for a control range of, said 1.2 microseconds corresponding to a delay line frequency cut-off variation from 6.5 to 9.5 megacycles. In order to avoid variations in frequency response which may result from the line, the low pass filter 45 should have an upper frequency limit of approximately 4.5 megacycles.

With a delay line having a 1.2 microsecond control range, it has been found that the correction in all cases occurs essentially instantaneously before the start of each active picture line. Picture material that would otherwise be completely unuseable because of displacements of the horizontal scanning lines can be effectively reproduced after correction in a system of the type shown in FIGS. 3A and 3B.

Figure 7:
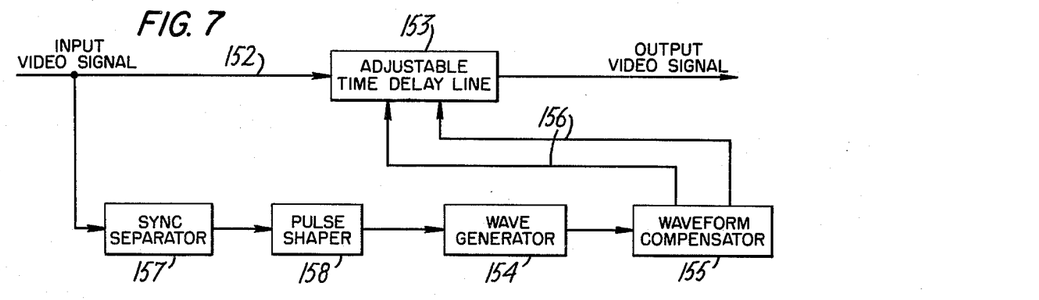
FIG. 7 is a schematic diagram of means for changing the time scale of a signal in accordance with the invention.

Instead of modifying the timing characteristic of a signal so as to eliminate an undesired effect therefrom, the modification may be of such character as to introduce a desired effect, as shown in FIG. 7. Here the input signal, which may be the usual composite video signal, is fed from a conductor 152 to a delay line 153 constructed according to the invention. If the desired objective is to introduce a predetermined form of distortion into the horizontal scanning lines for the purpose of creating a special effect, the delay line 153 should be supplied with a control voltage to vary the time delay of the line in such fashion as to produce the desired distortion in the horizontal scanning lines. This voltage can be supplied to the delay line 153 from a generator 154 of a wave of suitable form through a waveform compensator 155 and the conductors 156. The generator 154 may be synchronized with the incoming signal by supplying the latter to a synchronizing signal separator device 157, the output from which may be fed through a pulse shaper device 158 to the wave generator 154.

It will be understood that the timing characteristic of the input signal can be modified by equipment of the kind shown in FIG. 7 so as to correct nonlinearities in the horizontal scanning of a picture.

By proper choice of the output waveform from the generator 154, it is possible to change the time delay of the line 153 so as to change the time scale of the signal transmitted therethrough, without otherwise modifying the character of the signal. In this manner, it is possible to change the time scale for any wideband information signal, or the width or aspect ratio of a television picture. What is involved here is a changing control voltage during the time the signal is present in the delay line.

Figure 8:
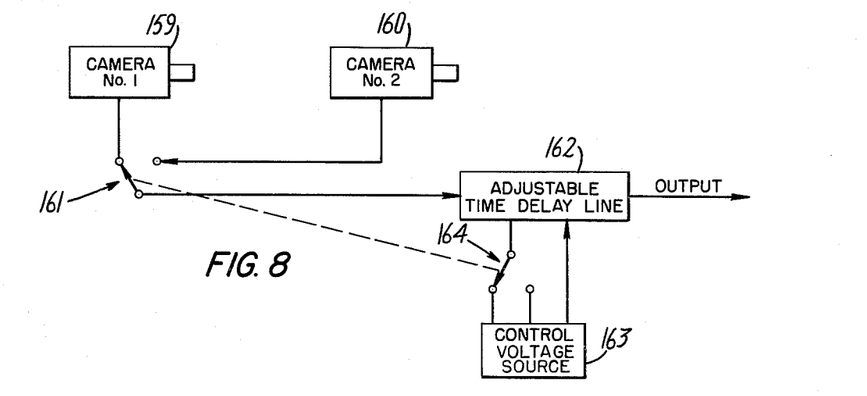
FIG. 8 illustrates schematically a television camera control system embodying the adjustable delay line means of the invention.

FIG. 8 illustrates an application of the invention to picture switching as in a television studio, for example. In this figure are shown two different video information sources 159 and 160, which may be television picture cameras, for example. The outputs of the cameras 159 and 160 may be switched selectively by a switch 161 to a delay line 162 of the kind shown in FIG. 5. The delay line is adapted to receive either of two different values of control voltage from a source 163 through a switch 164 connected for ganged operation with the switch 161. As the line 162 is switched from the camera 159 to the camera 160 or vice versa, the proper value of control voltage is supplied from the source 163 so as to assure the proper timing of the output waveform. This eliminates the necessity for a multiplicity of delay lines in individual picture sources of delay compensation.

Figure 9:
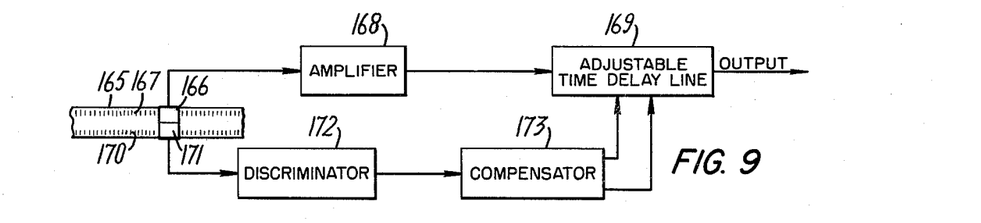
FIG. 9 is a schematic diagram of a sound reproducing system embodying the invention.

It will be understood that the controllable delay line according to the invention has utility in many applications in the audio frequency field. For example, it may be used to introduced a controlled time delay in electronic reverberation systems. Also, it may be used to remove the undesired effect known as "wow" from phonograph, tape or film recordings. A typical sound tape reproducing system embodying means, according to the invention, for accomplishing this is shown in FIG. 9. Referring to this figure, a magnetic tape 165 is transported by means (not shown) past a magnetic head 166 to induce therein electric signals from information recorded in a track 167. The electrical output from the magnetic head 166 is fed through an amplifier 168 to a controllable electric delay line 169 similar to that shown in FIG. 5.

In order to enable variations in tape transport speed to be readily detected, a signal of constant frequency, say 1,000 cycles per second, is recorded in a second track 170 on the tape 165 and is reproduced by a second magnetic head 171. When the tape 167 is running at the same speed at which the track 170 is recorded, the electrical output from the magnetic head is a steady signal at a frequency of 1,000 cycles per second. If, however, there are variations in the tape transport speed, the frequency of the electrical signal from the magnetic head 171 will vary from the reference value of 1,000 cycles per second. This control signal is fed to a frequency discriminator device 172 which converts these frequency variations to amplitude variations. The signal output of the discriminator 172 is fed through a suitable compensator 173 and is applied to the delay line 169 to control the time delay characteristic thereof.

As variations in tape transport speed occur, corresponding variations are produced in the signals picked up by the magnetic heads 166 and 171. The signal from the head 171 acts instantaneously to change the time scale for the signal passing through the delay line 169 so as to remove the effect of the tape speed variations from the signal picked up by the magnetic head 166.

Figure 10:
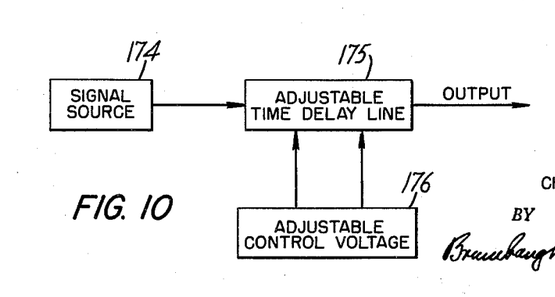
FIG. 10 illustrates how the adjustable delay line of the invention may be use as an adjustable cut-off band pass filter.

Since the frequency band pass of the delay line also varies with the control voltage, a controllable delay line according to the invention may be used as an adjustable cutoff band pass filter. Thus, as shown in FIG. 10, a signal having a range of frequency components from a source 174 may be fed through an adjustable low pass delay line 175 of the type shown in FIG. 5, controlled by adjustable control voltage from a source 176. By adjusting the control voltage, the frequency band pass of the line can be adjusted to a selected cutoff value.

Figure 11:
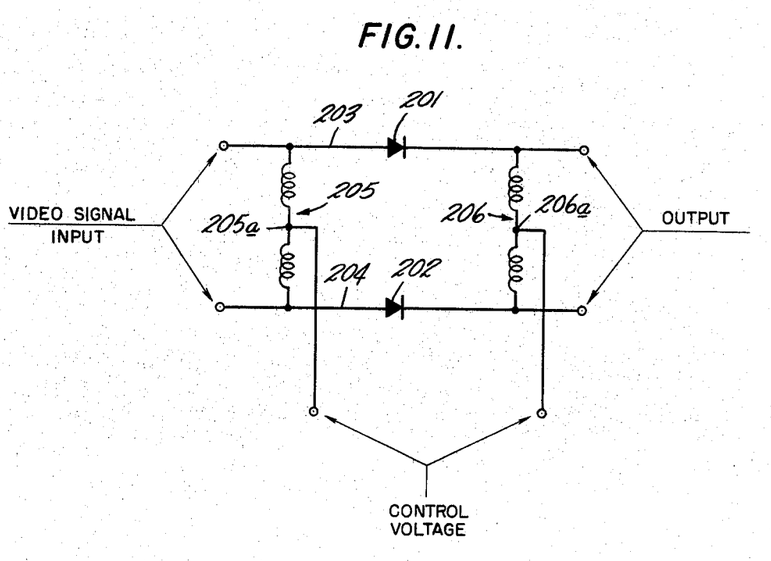
FIG. 11 is a schematic diagram of another embodiment of a controllable delay line constructed in accordance with the invention.

For a high pass filter, the voltage responsive capacitors in the delay line should, of course, be connected in series and the inductors in shunt. As an example, a suitable high pass filter may be formed by placing voltage responsive capacitors 201, 202 in series in each of the upper and lower legs 203, 204 of the line, and connecting center tapped inductors 205, 206 in shunt with the line on opposite sides of the capacitors. The capacitors 201, 202 should be poled so that they respond in the same way to the control voltage, which is applied between the inductor center taps 205a, 206a. The signal voltage is applied to the input end of the line. Since the capacitors 201, 202 are oppositely poled with respect to the input signal voltage, the line time delay is not affected by variations in the amplitude of the latter.

It will be apparent that timing correction apparatus of the type shown in FIGS. 3A and 3B can readily be adapted for making other signal timing corrections such as in the phase of color television subcarrier signals in accordance with variations in color subcarrier reference burst frequencies, in signals having repetitive reference pulses (or which can be modified to include the same) as used in data processing applications, or in faulty synchronizing or timing signals in television and other applications. Other applications of the invention will be readily apparent to those skilled in the art.

The specific embodiments described above and illustrated in the drawings are intended to be merely illustrative and are obviously susceptible of modification in form and detail within the scope of the following claims.

I claim:

1. Apparatus for modifying the timing characteristic of a signal, comprising adjustable means for delaying a signal, said adjustable means including first and second conductors, a shunt path between said conductors, and first and second capacitive means in said shunt path, said first and second capacitive means undergoing a change in capacitance in response to a potential difference thereacross, and controllable means for applying to said first and second conductors first and second control voltages, respectively, said control voltages being, with respect to ground, equal in magnitude and opposite in polarity.

2. Apparatus for modifying the timing characteristic of a signal, comprising adjustable means for delaying a signal, said adjustable means including first and second conductors, a shunt path between said conductors, and first and second capacitive means in said shunt path, said first and second capacitive means undergoing a change in capacitance in response to a potential difference thereacross, and means operated in timed relation to said signal for applying to said first and second conductors first and second control voltages, respectively, said control voltages being, with respect to ground, equal in magnitude and opposite in polarity.

3. Apparatus for modifying the timing characteristic of a signal, comprising means for sensing the difference betweeen a signal having a given timing characteristic and a signal having a reference timing characteristic, adjustable means for delaying said signal of given timing characteristic, said adjustable means including first and second conductors, a shunt path between said conductors, and first and second capacitive means in said shunt path, said first and second capacitive means undergoing a change in capacitance in response to a potential difference thereacross, said difference for applying to said first and second conductors first and second control voltages, respectively, said control voltages being, with respect to ground, equal in magnitude and opposite in polarity.

4. Apparatus for modifying the timing characteristic of a signal, comprising means operated in timed relation with a signal of given timing characteristic for producing a signal of reference timing characteristic, adjustable means for delaying said signal of given timing characteristic, said adjustable means including first and second conductors, a shunt path between said conductors, and first and second capacitive means in said shunt path, said first and second capacitive means undergoing a change in capacitance in response to a potential difference thereacross, and means jointly responsive to said signal of given timing characteristic and to said signal of reference timing characteristic for applying to said first and second conductors first and second control voltages, respectively, said control voltages being, with respect to ground, equal in magnitude and opposite in polarity.

5. Apparatus for modifying the timing characteristic of periodically varying signals, comprising a signal transmission channel for said signals, means for sensing the difference in timing between said first signals and periodically occurring reference timing signals and adjustable signal-time-delay means in said channel, said adjustable means including first and second conductors, a shunt path between said conductors, and first and second capacitive means in said shunt path, said first and second capacitive means undergoing a change in capacitance in response to a potential difference thereacross, and controllable means for applying to said first and second conductors first and second control voltages, respectively, said control voltages being, with respect to ground, equal in magnitude and opposite in polarity.

6. Apparatus for modifying the timing characteristic of periodically varying first signals, comprising a signal transmission channel for said first signals, means responsive to said first signals for generating periodically varying reference timing signals, means jointly responsive to said first signals and to said reference signals for providing an error signal representative of timing differences therebetween, adjustable signal-time-delay means in said channel, said adjustable means including first and second conductors, a shunt path between said conductors, and first and second capacitive means in said shunt path, said first and second capacitive means undergoing a change in capacitance in response to a potential difference thereacross, and controllable means responsive to said error signal for applying to said first and second conductors first and second control voltages, respectively, said control voltages being, with respect to ground, equal in magnitude and opposite in polarity.

7. Apparatus for modifying the timing characteristic of periodically varying first signals, comprising a signal transmission channel for said first signals, means for generating pulses having the same timing as said first signals, oscillator means, automatic frequency control means jointly responsive to said pulses and to the output of said oscillator means for causing said oscillator means to generate signals at the average frequency of said pulses, adjustable signal time delay means in said channel, said adjustable means including first and second conductors, a shunt path between said conductors, and first and second capacitive means in said shunt path, said first and second capacitive means undergoing a change in capacitance in response to a potential difference thereacross, and timing difference detector means jointly responsive to said pulses and to signals from said oscillator means for applying to said first and second conductors first and second control voltages, respectively, said control voltages being, with respect to ground, equal in magnitude and opposite in polarity.

8. Apparatus for modifying the timing characteristic of periodically varying first signals, comprising a signal transmission channel for said first signals, means for generating pulses having the same timing as said first signals, oscillator means, timing difference detector means jointly responsive to said pulses and to signals from said oscillator means for providing a difference signal representative of timing deviations between said pulses and said first signals, automatic frequency control means responsive to said difference signal for adjusting the frequency of said oscillator means to the average frequency of said pulses, adjustable signal time delay means in said channel, said adjustable means including first and second conductors, a shunt path between said conductors, first and second capacitive means in said shunt path, said first and second capacitive means undergoing a change in capacitance in response to a potential difference thereacross, and means responsive to said difference signal for applying to said first and second conductors first and second control voltages, respectively, said control voltages being, with respect to ground, equal in magnitude and opposite in polarity.

9. Apparatus as in claim 8 for modifying the timing characteristic of periodically varying first signals together with means jointly responsive to said pulses and to signals from said oscillator means for acting upon said automatic frequency control means to facilitate bringing said oscillator means in synchronism with said pulses.

10. Apparatus for modifying the timing characteristic of periodically varying signals including synchronizing signal components and information carrying components, comprising a transmission channel for said signals, means for separating said synchronizing signal components from said signals, means for producing pulses in synchronism with said separated synchronizing signal components, means for producing periodically varying reference signals at the average frequency of said pulses, difference signal detector means jointly responsive to said pulses and reference signals for producing a difference signal representative of instantaneous timing deviations between said pulses and reference signals, adjustable signal time delay means in said transmission channel, said adjustable means including first and second conductors, a shunt path between said conductors, first and second capacitive means in said shunt path, said first and second capacitive means undergoing a change in capacitance in response to a potential difference thereacross, and means responsive to said difference signal for applying to said first and second conductors first and second control voltages, respectively, said control voltages being, with respect to ground, equal in magnitude and opposite in polarity.

11. Apparatus for modifying the timing characteristic of periodically varying signals including synchronizing signal components and information carrying components, comprising a transmission channel for said signals, controllable signal gating means connected to receive said periodically varying signals, means responsive to said periodically varying signals for establishing a reference level for signals received by said gating means, bistable trigger means connected to receive the output of said gating means, means responsive to the output of said trigger means for producing pulses, means for producing periodically varying reference signals at the average frequency of said pulses, means responsive to said periodically varying signals for supplying control signals to said gating means to gate the same, adjustable signal time delay means in said transmission channel, detector means jointly responsive to said pulses and to said reference signals for producing a difference signal representative of instantaneous timing differences between said pulses and said reference signals, and means for supplying said difference signal in push-pull to said time delay means to control the time delay characteristic thereof.

12. Apparatus for modifying the timing characteristic of periodically varying signals including synchronizing signal components and information carrying components, comprising a transmission channel for said signals, controllable signal gating means connected to receive said periodically varying signals, means responsive to said periodically varying signals for establishing a reference signal level for signals received by said gating means, bistable trigger means connected to receive the output of said gating means, means responsive to the output of said trigger means for producing pulses, oscillator means, sawtooth wave generator means synchronized with said oscillator means, phase discriminator means jointly responsive to said pulses and to the output of said sawtooth wave generator means for producing a control signal representative of instantaneous phase deviations therebetween, automatic frequency control means responsive to the direct current component of said control signal for automatically adjusting the frequency of said oscillator means to the average frequency of said pulses, means responsive to signals from said oscillator means for supplying gating signals to said gating means, adjustable signal time delay means in said transmission channel, and means responsive to said control signal for supplying a push-pull signal to said time delay means to control the time delay characteristic thereof.

13. Apparatus as in claim 12 together with means jointly responsive to said pulses and to the output of said oscillator means for temporarily modifying the action of said automatic frequency control means to facilitate pulling said oscillator means into synchronism with said narrow pulses.

14. Signal time delay means comprising lumped constant transmission line means including a group of series connected electrical elements and a group of shunt connected electrical elements, the elements in one of said groups being inductors, and the elements in the other of said groups being capacitors undergoing a change in capacitance in response to a potential difference thereacross, and controllable means for applying to opposite sides of said capacitors first and second control voltages, respectively, said control voltages being, with respect to ground, equal in magnitude and opposite in polarity.

15. Signal time delay means comprising lumped constant transmission line means including series inductors and shunt capacitors undergoing a change in capacitance in response to a potential difference thereacross, and controllable means for applying to opposite sides of said capacitors first and second control voltages, respectively, said control voltages being, with respect to ground, equal in magnitude and opposite in polarity.

16. Signal time delay means comprising lumped constant transmission line means including a plurality of inductors in shunt and a plurality of capacitors in series between adjacent inductors, said capacitors undergoing a change in capacitance in response to a potential difference thereacross, and controllable means for applying to opposite sides of said capacitors first and second control voltages, respectively, said control voltages being, with respect to ground, equal in magnitude and opposite in polarity.

17. Signal time delay means comprising lumped constant transmission line means including a plurality of inductors in series and a plurality of capacitors in shunt between adjacent inductors, said capacitors undergoing a change in capacitance in response to a potential difference thereacross, and controllable means for applying to opposite sides of said capacitors first and second control voltages, respectively, said control voltages being, with respect to ground, equal in magnitude and opposite in polarity.

18. Signal time delay means comprising lumped constant transmission line means including a plurality of inductors in series, a first plurality of voltage-responsive capacitors connected between adjacent inductors and a first common bus, a second plurality of voltage-responsive capacitors connected between adjacent inductors and a second common bus, said voltage-responsive capacitors forming unilaterally conductive paths from said one bus to said second bus, and controllable means for applying to said first and second buses first and second control voltages, respectively, said control voltages being, with respect to ground, equal in magnitude and opposite in polarity.

19. Signal time delay means comprising lumped constant transmission line means including a group of series connected electrical elements and a group of shunt connected electrical elements, the elements in one of said groups being inductors and the elements in the other of said groups being voltage-responsive capacitors, and controllable means for applying to opposite sides of said capacitors first and second control voltages, respectively, said control voltages being, with respect to ground, equal in magnitude and opposite in polarity.

20. Signal time delay means comprising lumped constant transmission line means including series inductors and shunt voltage-responsive capacitors, and controllable means for applying to opposite sides of said capacitors first and second control voltages, respectively, said control voltages being, with respect to ground, equal in magnitude and opposite in polarity.

21. Signal time delay means comprising lumped constant transmission line means including shunt inductors and series voltage-responsive capacitors, and controllable means for applying to opposite sides of said capacitors first and second control voltages, respectively, said control voltages being, with respect to ground, equal in magnitude and opposite in polarity.

22. Signal time delay means comprising lumped constant transmission line means including a plurality of inductors in series, a first plurality of voltage-responsive capacitors connected between adjacent inductors and a first common bus, and a second plurality of voltage-responsive capacitors connected between adjacent inductors and a second common bus, said voltage-responsive capacitors forming unilaterally conductive paths from said one bus to said second bus, and controllable means for applying to said first and second buses first and second control voltages, respectively, said control voltages being, with respect to ground, equal in magnitude and opposite in polarity.

23. Electrical filter means comprising lumped constant transmission line means including a group of series connected electrical elements and a group of shunt connected electrical elements, the electrical elements in one of said groups being inductors and the elements in the other of said groups being voltage-responsive capacitors, and controllable means for applying to opposite sides of said capacitors first and second control voltages, respectively, said control voltages being, with respect to ground, equal in magnitude and opposite in polarity.

24. Electrical filter means comprising lumped constant transmission line means including series inductors and voltage-responsive shunt capacitors, and controllable means for applying to opposite sides of said capacitors first and second control voltages, respectively, said control voltages being, with respect to ground, equal in magnitude and opposite in polarity.

25. Electrical filter means comprising lumped constant transmission line means including shunt inductors and voltage-responsive series capacitors, and controllable means for applying to opposite sides of said capacitors first and second control voltages, respectively, said control voltages being, with respect to ground, equal in magnitude and opposite in polarity.

26. In combination with apparatus as defined in claim 25, signal gating means comprising a bridge network having unilaterally conductive devices in the adjacent arms thereof, signal transmission channel means connected to one diagonal of said bridge network, a shunt path having unilaterally conductive means therein connected to another diagonal of said bridge, and means supplying a gating signal to said other diagonal of said bridge network.

27. Apparatus for modifying the timing characteristic of a signal, comprising a transmission channel for said signal, adjustable signal delay means in said channel, said adjustable means including first and second conductors, a shunt path between said conductors, and first and second capacitive means in said shunt path, said first and second capacitive means undergoing a change in capacitance in response to a potential difference thereacross, and controllable means operated in timed relation to said signal for applying to said first and second conductors first and second control voltages, respectively, said control voltages being, with respect to ground, equal in magnitude and opposite in polarity.

28. In combination, a first source of a varying signal, a second source of a varying signal, a transmission channel, adjustable signal delay means in said channel, said adjustable means including first and second conductors, a shunt path between said conductors, and first and second capacitive means in said shunt path, said first and second capacitive means undergoing a change in capacitance in response to a potential difference thereacross, first switching means for connecting said first and second sources selectively to said channel, and controllable means operated with said switching means for applying to said first and second conductors first and second control voltages, respectively, said control voltages being, with respect to ground, equal in magnitude and opposite in polarity.

29. In recording reproducing apparatus, the combination of pickup means, means for transporting a record medium in transducing relation to said pickup means, adjustable signal time delay means connected to receive the output of said pickup means, said adjustable means including first and second conductors, a shunt path between said conductors, and first and second capacitive means in said shunt path, said first and second capacitive means undergoing a change in capacitance in response to a potential difference thereacross, and controllable means for applying to said first and second conductors first and second control voltages, respectively, said control voltages being, with respect to ground, equal in magnitude and opposite in polarity.

30. Apparatus for modifying the timing characteristic of a signal, comprising a transmission channel for said signal, adjustable signal delay means in said channel, said adjustable means including first and second conductors, a shunt path between said conductors, and first and second capacitive means in said shunt path, said first and second capacitive means undergoing a change in capacitance in response to a potential difference thereacross, and controllable means for applying to said first and second conductors first and second control voltages, respectively, said control voltages being, with respect to ground, equal in magnitude and opposite in polarity.

References Cited by the Examiner
UNITED STATES PATENTS

| | | | |
|---|---|---|---|
| 2,529,117 | 11/50 | Tompkins | 333—25 |
| 2,828,478 | 3/58 | Johnson | 333—17 |
| 2,852,750 | 9/58 | Goldberg | 333—18 |
| 2,907,957 | 10/59 | Dewitz | 333—18 |
| 2,960,571 | 11/60 | Malthaner | 333—18 |
| 2,961,535 | 11/60 | Lanning | 333—27 |
| 2,988,593 | 6/61 | Olive | 178—5.4 |
| 3,016,593 | 1/62 | Johnson | 178—5.4 |
| 3,019,291 | 1/62 | Houghton | 338—18 |

HERMAN KARL SAALBACH, *Primary Examiner.*

BENNETT G. MILLER, *Examiner.*